United States Patent
Sato et al.

(10) Patent No.: US 11,487,257 B2
(45) Date of Patent: Nov. 1, 2022

(54) INFORMATION PROCESSING DEVICE AND NON-TRANSITORY COMPUTER READABLE MEDIUM

(71) Applicant: AGAMA-X CO., LTD., Tokyo (JP)

(72) Inventors: Masahiro Sato, Kanagawa (JP); Kengo Tokuchi, Kanagawa (JP)

(73) Assignee: Agama-X Co., Ltd., Tokyo (JP)

( * ) Notice: Subject to any disclaimer, the term of this patent is extended or adjusted under 35 U.S.C. 154(b) by 0 days.

(21) Appl. No.: 16/842,940

(22) Filed: Apr. 8, 2020

(65) Prior Publication Data

US 2021/0173367 A1     Jun. 10, 2021

(30) Foreign Application Priority Data

Dec. 5, 2019   (JP) .............................. JP2019-220281

(51) Int. Cl.
*G05B 19/042*     (2006.01)

(52) U.S. Cl.
CPC .. *G05B 19/042* (2013.01); *G05B 2219/39385* (2013.01)

(58) Field of Classification Search
CPC .................... G05B 19/042; G05B 2219/39385
USPC ......................................................... 700/83
See application file for complete search history.

(56) References Cited

U.S. PATENT DOCUMENTS

| | | | | |
|---|---|---|---|---|
| 2008/0180235 A1* | 7/2008 | Chang | ...... | A61B 5/01 340/449 |
| 2011/0077548 A1* | 3/2011 | Torch | ...... | A61B 5/165 600/558 |
| 2015/0338917 A1* | 11/2015 | Steiner | ...... | H04L 9/3271 345/156 |
| 2016/0001781 A1* | 1/2016 | Fung | ...... | B60K 28/02 701/36 |
| 2016/0005290 A1* | 1/2016 | Takahashi | ...... | A61B 5/681 340/575 |
| 2016/0090103 A1* | 3/2016 | Tan | ...... | B60W 50/10 345/156 |
| 2016/0154493 A1* | 6/2016 | Song | ...... | G06F 3/013 345/173 |
| 2018/0022359 A1* | 1/2018 | Gusenbauer | ...... | B60W 50/14 340/439 |
| 2020/0128902 A1* | 4/2020 | Brown | ...... | A42B 3/042 |

FOREIGN PATENT DOCUMENTS

JP     2015-211705 A     11/2015
JP     2016-67922 A      5/2016

* cited by examiner

*Primary Examiner* — Michael W Choi
(74) *Attorney, Agent, or Firm* — Hoffman Warnick LLC

(57) ABSTRACT

An information processing device includes a processor configured to not operate equipment according to biological information indicating an operation item of the equipment in a case where the biological information not expected to be produced from a user under specific circumstances is measured from the user.

16 Claims, 3 Drawing Sheets

| ID | STANDARD BRAIN WAVE | OPERATION INFORMATION |
|---|---|---|
| 1 |  | TURN ON COOLER OF AIR CONDITIONER |
| 2 |  | TURN OFF COOLER OF AIR CONDITIONER |
| ... | ... | ... |

| ID | STANDARD BRAIN WAVE | OPERATION INFORMATION | USER INFORMATION |
|---|---|---|---|
| 1 |  | TURN ON COOLER OF AIR CONDITIONER | USER A |
| 2 |  | TURN ON COOLER OF AIR CONDITIONER | USER B |
| 3 |  | TURN OFF COOLER OF AIR CONDITIONER | USER A |
| ... | ... | ... | ... |

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-220281 filed Dec. 5, 2019.

BACKGROUND

(i) Technical Field

The present disclosure relates to an information processing device and a non-transitory computer readable medium.

(ii) Related Art

It is conceivable to operate equipment by using biological information such as brain waves.

Japanese Unexamined Patent Application Publication No. 2015-211705 describes a device that detects a brain-wave biological signal from the brain waves of a user, detects a surface electromyography biological signal from the surface myoelectric potential of the user, and computes a control signal on the basis of both biological signals.

Japanese Unexamined Patent Application Publication No. 2016-67922 describes a device that acquires the brain waves of the user and selectively operates multiple devices to be operated in accordance with an analysis result obtained by analyzing the brain waves.

SUMMARY

Meanwhile, in some cases, biological information indicating an operation of equipment is produced and measured from the user even though the user has no intention of operating the equipment. In such cases, a situation occurs in which the equipment is operated contrary to the intention of the user.

Aspects of non-limiting embodiments of the present disclosure relate to keeping equipment from being operated using biological information from a user in a case where the user has no intention of operating the equipment.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor configured to not operate equipment according to biological information indicating an operation item of the equipment in a case where the biological information not expected to be produced from a user under specific circumstances is measured from the user.

BRIEF DESCRIPTION OF THE DRAWINGS

An exemplary embodiment of the present disclosure will be described in detail based on the following figures, wherein.

DETAILED DESCRIPTION

Figure 1:
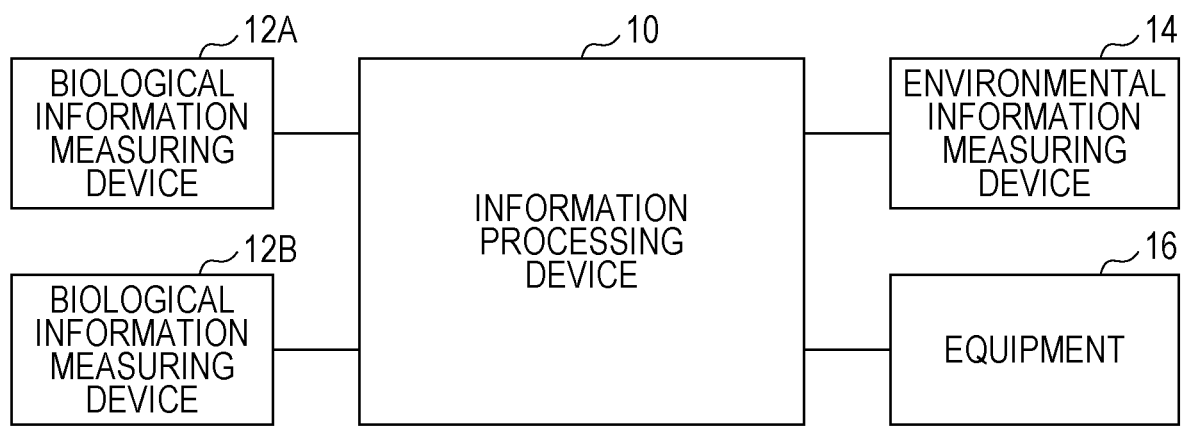
FIG. 1 is a block diagram illustrating a configuration of an information processing system according to an exemplary embodiment.
Figure 2:
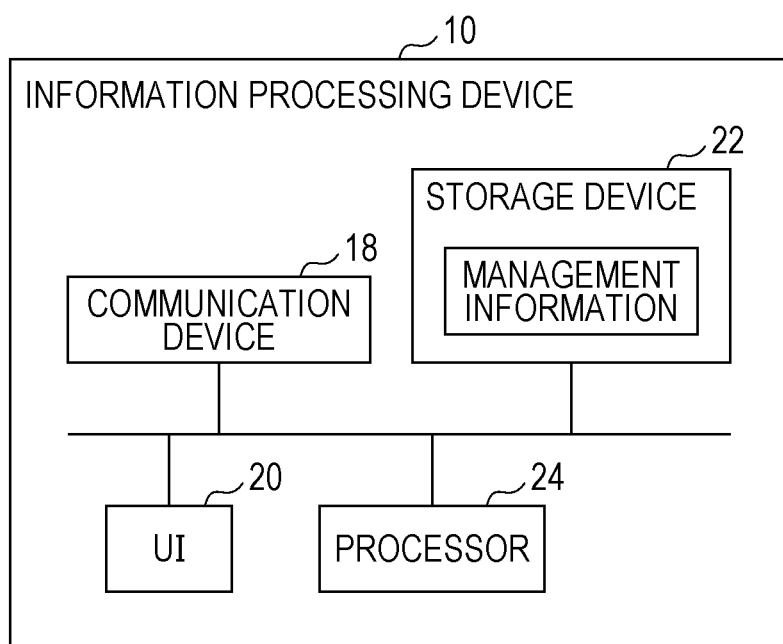
FIG. 2 is a block diagram illustrating a configuration of an information processing device according to the exemplary embodiment.

An information processing system according to the exemplary embodiment will be described with reference to FIG. 1. FIG. 1 illustrates an example of the configuration of the information processing system according to the exemplary embodiment.

The information processing system according to the exemplary embodiment includes an information processing device 10, multiple biological information measuring devices, one or more environmental information measuring devices 14, and one or more pieces of equipment 16. In the example illustrated in FIG. 1, the information processing system includes biological information measuring devices 12A and 12B, but this is merely one example. In the following, the biological information measuring devices 12A and 12B will be referred to as the "biological information measuring device(s) 12" when it is not necessary to distinguish between the biological information measuring devices 12A and 12B. Note that the number of each type of device illustrated in FIG. 1 is merely one example, and the number of each type of device is not limited to the numbers of devices illustrated in FIG. 1. In addition, the information processing system may also include other devices (for example, an external device such as a server) besides the devices illustrated in FIG. 1.

The information processing device 10, the biological information measuring device(s) 12, the environmental information measuring device(s) 14, and the equipment 16 are configured to communicate with other devices and the like. The communication may be wired communication using a cable, or wireless communication. In other words, each device may transmit and receive information with each other through physical connection to other devices and the like using a cable, or transmit and receive information with each other through wireless communication. For the wireless communication, a technology such as short-range wireless communication or Wi-Fi (registered trademark) may be used, for example. Wireless communication according to a standard other than the above may also be used. The short-range wireless communication may be a technology such as Bluetooth (registered trademark), radio-frequency identifier (RFID), or NFC, for example. Each device may also communicate with another device, another sensor, or the like through a communication channel such as a local area network (LAN) or the Internet.

The information processing device 10 is for example a personal computer (hereinafter referred to as "PC"), a tablet PC, a smartphone, a mobile phone, or some other type of device. The information processing device 10 may be a terminal device that the user is able to carry (such as a tablet PC, a smart phone, or a mobile phone, for example), or a device that is installed on a table or the like and used. The information processing device 10 may also be a smart speaker including communication functions, a microphone, and a speaker. The information processing device 10 may be installed indoors (such as on the floor, ceiling, or on a table in a room for example), or may installed outdoors. Additionally, the information processing device 10 may also be a device capable of movement (for example, a self-propelled device).

The biological information measuring devices 12 include components such as sensors and electrodes, and are configured to measure biological information about a user. Each biological information measuring device 12 may measure a different type of biological information. Obviously, some or all of the biological information measuring devices 12 may also be configured to measure the same type of biological information. In addition, each biological information measuring device 12 may be configured to measure a single type of biological information or multiple types of biological information.

Each biological information measuring device 12 transmits biological information measured by itself to the information processing device 10. Each biological information measuring device 12 may transmit the biological information to the information processing device 10 every time the biological information is measured, or each biological information measuring device 12 may store the biological information and transmit the biological information to the information processing device 10 at predetermined time intervals or transmit the biological information to the information processing device 10 at a timing specified by the user. Also, each biological information measuring device 12 may receive biological information measured by another biological information measuring device 12 from the other biological information measuring device 12, and transmit the biological information measured by itself together with the biological information measured by the other biological information measuring device 12 to the information processing device 10.

Each biological information measuring device 12 may also analyze the biological information measured by itself or another biological information measuring device, and transmit information indicating the analysis result to the information processing device 10. For example, each biological information measuring device 12 may include a processor, and the processor may analyze the biological information. Obviously, such analysis may also be performed by the information processing device 10.

The biological information measuring device 12 may include a battery and be driven by power supplied from the battery, or be driven by receiving a supply of power from the information processing device 10.

The biological information measuring device 12 may also be a wearable device that is entirely worn on the user and measures biological information. For example, the biological information measuring device 12 may be a device worn on the user's head, a hearable device worn on the user's ear, a device worn on a part of the body such as the user's arm hand, wrist, or finger (such as a wristwatch-style device for example), a device worn around the user's neck, or a device worn on a part of the body such as the user's torso or leg.

The biological information is any of various types of physiological information and anatomical information produced by the living body of the user. As a conceptual category, biological information includes information such as information indicating the activity of the brain (such as brain waves, the quantity of cerebral blood flow, or a cerebral magnetic field signal, for example), pulse frequency, blood pressure, heart rate, an electrocardiogram waveform a myoelectric waveform eye movement, body temperature, perspiration, line of sight, speech, and user movement, for example. The above biological information is merely an example, and other physiological information and anatomical information may also be used as the biological information. The biological information measuring device 12 may measure one type or multiple types of biological information from among the above types of biological information.

Additionally, the conceptual category of biological information includes bioelectric potential information indicating an electric potential measured from a living body. As a conceptual category, bioelectric potential information includes information such as brain waves obtained as a result of measuring tiny electric currents produced in association with brain activity, an electrocardiogram obtained as a result of measuring tiny electric currents produced in association with the pumping action of the heart, an electromyogram obtained as a result of measuring tiny electric currents produced in association with muscle activity, and electrodermal activity obtained as a result of measuring tiny electric currents occurring in the skin, for example. The above bioelectric potential information is merely an example, and bioelectric potential information other than the above may also be used.

The information processing device 10 receives biological information from the biological information measuring device 12 and performs operations such as analyzing the biological information, storing the biological information, outputting the biological information, storing information indicating a result of analyzing the biological information, and outputting information indicating a result of analyzing the biological information. Obviously, the analysis of the biological information may also be performed by the biological information measuring device 12. Outputting the biological information means displaying the biological information or outputting the biological information as sound information, for example. Outputting information indicating a result of analyzing the biological information means displaying information indicating an analysis result or outputting an analysis result as sound information, for example. The information processing device 10 may also transmit information indicating the biological information and the analysis result to another device.

The information processing device 10 may include one or multiple biological information measuring devices 12. In other words, one or multiple biological information measuring devices 12 may be incorporated into the information processing device 10 to form a single device. The entirety of the information processing device 10 including the one or more biological information measuring devices 12 may also be worn on the user and measure biological information. In other words, the information processing device 10 may also be a wearable device. For example, the information processing device 10 may be a device worn on the user's head, a hearable device worn on the user's ear, a device worn on a part of the body such as the user's arm hand, wrist, or finger (such as a wristwatch-style device), a device worn around the user's neck, or a device worn on a part of the body such as the user's torso or leg.

The information processing device 10 and the biological information measuring device 12 may also be separate devices. For example, the information processing device 10 may be a smart speaker, and the biological information measuring device 12 may be a wearable device worn on the user.

The environmental information measuring device 14 is configured to measure environmental information related to the environment surrounding the user and the environmental information measuring device 14. For example, the environmental information measuring device 14 is a device such as a camera that takes images, a microphone that collects sound, a temperature sensor that measures temperature, a humidity sensor that measures humidity, an odor sensor that measures odors, an illuminance sensor that measures brightness, an infrared sensor, or a presence sensor. One or more of the above sensors may be included in the information processing system as the environmental information measuring device 14.

For example, an image of the surroundings of the information processing device 10 or another place is taken by a camera, and image data expressing the surroundings or image data expressing the other place is generated. The image data may be moving image data or still image data. Image data taken by the camera corresponds to one example of environmental information related to the environment included in the image-taking range of the camera. Also, image data expressing the user that is generated by taking an image of the user with the camera corresponds to one example of biological information about the user. For example, characteristics such as user motion or the user's body type detected from the image data corresponds to one example of biological information about the user. In this sense, the camera corresponds to one example of the biological information measuring device 12 that measures biological information about the user.

Also, sounds around a microphone (for example, a person's speech and other sounds) are input into the microphone, and sound data is generated by the microphone. Sound data expressing the sound input into the microphone corresponds to one example of environmental information related to the environment surrounding the microphone. Also, sound data expressing the user's speech input into the microphone corresponds to one example of biological information about the user. In this sense, the microphone corresponds to one example of the biological information measuring device 12 that measures biological information about the user.

Likewise, data measured by sensors such as a temperature sensor, a humidity sensor, an odor sensor, an illuminance sensor, an infrared sensor, and a presence sensor corresponds to one example of environmental information. Also, data measured from the user by the above sensors corresponds to one example of biological information about the user. In this sense, the above sensors correspond to one example of the biological information measuring device 12 that measures biological information about the user.

The environmental information may also include Information such as information indicating the size of the room where the user is present, information indicating the size of the room where the equipment is installed, and information indicating the number of windows provided in the room.

Note that one or multiple environmental information measuring devices 14 may be included in the information processing device 10.

The equipment 16 is a device such as a PC, a tablet PC, a smartphone, a mobile phone, a robot (such as a humanoid robot, a non-humanoid animal robot, a cleaning robot, or some other type of robot, for example), a projector, a display device such as a liquid crystal display, a recording device, a playback device, an imaging device such as a camera, a refrigerator, a rice cooker, a microwave oven, a coffee maker, a vacuum cleaner, a washing machine, an air conditioner, lighting equipment, a clock, a surveillance camera, an automobile, a motorcycle, an aircraft (such as an unmanned aerial vehicle (for example, a drone)), a game console, a gas stove, a toilet seat with a bidet function, a ventilation fan, a doorbell, an entrance monitor, an elevator, a door, a window, or any of various types of sensing equipment (such as a temperature sensor, a humidity sensor, a voltage sensor, or a current sensor), for example. Equipment in general may also be included in the conceptual category of the equipment 16. For example, information equipment, video equipment, audio equipment, and other types of equipment may be included in the category of the equipment 16 according to the exemplary embodiment.

The equipment 16 includes a communication device that acts as a communication interface, a storage device that stores data, and a processor that controls the operation of the equipment 16. The equipment 16 may also include a user interface. The equipment 16 may also transmit equipment identification information for identifying the equipment 16 itself to the information processing device 10. For example, the equipment identification information is information such as an ID, a name, a serial number, or an address (such as a MAC address or an IP address for example) of the equipment 16.

Hereinafter, a configuration of the information processing device 10 will be described in detail.

The information processing device 10 includes a communication device 18, a UI 20, a storage device 22, and a processor 24, for example. The information processing device 10 may also include components other than the above.

The communication device 18 is a communication interface, and has a function of transmitting data to other devices and a function of receiving data transmitted from other devices. The communication device 18 may have a wireless communication function, and may also have a wired communication function. The communication device 18 may communicate with another device by using short-range wireless communication for example, or communicate with another device through a communication channel such as a LAN or the Internet. For example, the communication device 18 receives biological information transmitted from the biological information measuring device 12. The communication device 18 may also transmit control information for controlling the operation of the biological information measuring device 12 to the biological information measuring device 12. In addition, the communication device 18 receives environmental information transmitted from the environmental information measuring device 14. The communication device 18 may also transmit control information for controlling the operation of the environmental information measuring device 14 to the environmental information measuring device 14. In addition, the communication device 18 transmits control information for controlling the operation of the equipment 16 to the equipment 16. The communication device 18 may also receive information transmitted from the equipment 16.

The UI 20 is a user interface, and includes a display device and an operation device. The display device is a device such as a liquid crystal display or an EL display. The operation device is a device such as a keyboard, input keys, or a control panel. The UI 20 may be a UI such as a touch panel combining a display device with an operation device. In addition, a microphone may also be included in the UI 20, and a speaker that emits sound may also be included in the UI 20.

The storage device 22 is a device that establishes one or multiple storage areas that store various types of data. For example, the storage device 22 is a hard disk drive, any of various types of memory (such as RAM DRAM and ROM for example), another type of storage device (such as an optical disc, for example), or a combination of the above. One or more storage devices 22 are included in the information processing device 10.

Management information is stored in the storage device 22. The management information is information for specifying an operation item of the equipment 16 on the basis of the biological information measured from the user. For example, predetermined standard biological information and operation information indicating an operation item of the equipment 16 are associated with each other and registered in the management information in advance. The standard biological information may be biological information that is anticipated to occur in the user who performs an operation associated with the standard biological information, or biological information that is anticipated to occur in the user who requests the execution of the operation. The standard biological information may also be considered to be biological information corresponding to an operation item of the equipment 16. The standard biological information and the operation information may be associated with each other and registered in the management information for each user.

In the management information, operation information related to an operation item regarding a power state of the equipment 16 may be registered, operation information related to an operation item regarding a function level of the equipment 16 may be registered, or both operation information related to an operation item regarding the power and operation information related to an operation item regarding a function level may be registered.

The operation item regarding the power state of the equipment 16 is an operation of turning the equipment 16 on or off. The operation information related to the operation item regarding the power state is information indicating an operation of turning the equipment 16 on or off. The biological information associated with the operation information related to the operation item regarding the power state may be considered to be biological information corresponding to turning the equipment 16 on or off. Operation information related to the operation item regarding the power state of the equipment 16 and standard biological information may be associated with each other and registered in the management information for each user.

The operation item regarding a function level of the equipment 16 is an operation of setting a function level of the equipment 16. The operation information related to the operation item regarding a function level is information indicating an operation of setting a function level of the equipment 16. The biological information associated with the operation information related to the operation item regarding a function level may be considered to be biological information corresponding to a function level of the equipment 16. Operation information related to the operation item regarding a function level of the equipment 16 and standard biological information may be associated with each other and registered in the management information for each user.

A function level is a level related to the performance or output of the equipment 16, for example. To give specific examples, the set temperature of an air conditioner, the amount of airflow of an air conditioner, the direction of airflow of an air conditioner, the activation or deactivation of a dehumidifier function of an air conditioner, the brightness of a display device, the brightness of a lighting device, the volume of a speaker, the movement speed of a self-propelled device (such as a robot or a self-propelled vacuum cleaner, for example), settings in devices such as an imaging device, a recording device, and a playback device, settings in devices such as a refrigerator, a rice cooker, and a microwave oven, settings in any of various types of sensing equipment, and the like correspond to examples of function levels. However, the above are merely an example, and set values and the like other than the above may also be function levels.

The processor 24 is configured to acquire biological information about the user and output an instruction for operating the equipment 16 in accordance with the biological information.

For example, when biological information is measured by the biological information measuring device 12, the biological information is transmitted from the biological information measuring device 12 to the information processing device 10. The processor 24 receives the biological information and ascertains an operation item of the equipment 16 on the basis of the biological information. The processor 24 operates the equipment 16 by transmitting control information including information indicating the ascertained operation item to the equipment 16. The equipment 16 receiving the control information operates in accordance with the control information.

For example, a brain-machine interface may be constructed by a biological information measuring device 12 that measures the activity of the brain and the information processing device 10. The brain-machine interface may be invasive or non-invasive. In this case, the processor 24 operates the equipment 16 on the basis of the activity (such as brain waves for example) of the user's brain. To operate the equipment 16, the processor 24 may extract a characteristic component from brain waves, and operate the equipment 16 on the basis of the extracted component. To extract a characteristic component from brain waves, techniques such as a fast Fourier transform (FFT), a wavelet transform (WT), a time-frequency distribution (TFD), eigenvector methods (EM), or an autoregressive model (ARM) may be used. Also, as a method of linking brain waves to an operation item of the equipment 16 using feature vectors obtained by feature extraction, for example, techniques such as independent component analysis (ICA), k-means clustering, a support vector machine (SVM), or a convolutional neural network may be used.

In addition, the processor 24 may also be configured to receive equipment identification information transmitted from the equipment 16 and identify the equipment 16. For example, the processor 24 may transmit an acquisition request for equipment identification information to the equipment 16, and acquire equipment identification information transmitted from the equipment 16 in response to the acquisition request. Also, equipment identification information may be transmitted to the information processing device 10 from the equipment 16 made capable of communicating with the information processing device 10 by being connected to the information processing device 10 or the like, and the processor 24 may receive the equipment identification information transmitted in this way. For example, the equipment identification information is information such as information indicating a name of the equipment 16, information indicating a serial number of the equipment 16, or information indicating an address (such as a MAC address or an IP address for example) of the equipment 16.

In addition, the processor 24 may also be configured to control the operation of each unit of the information processing device 10. The processor 24 may include memory.

Also, in the case where biological information indicating an operation item of the equipment 16 not expected to be produced from the user under specific circumstances is measured from the user, the processor 24 does not operate the equipment 16 according to the biological information. On the other hand, in the case where biological information indicating an operation item of the equipment 16 is measured from the user under circumstances other than the specific circumstances, the processor 24 operates the equipment 16 according to the biological information.

For example, the specific circumstances are circumstances in which other specific biological information different from the biological information indicating an operation item of the equipment 16 is measured from the user. The biological information indicating an operation item and the specific biological information may be the same type of biological information or different types of biological information, and may be measured by the same biological information measuring device 12 or measured by different biological information measuring devices 12.

Hereinafter, the relationship between the times when the biological information indicating an operation item of the equipment 16 and the specific biological information are measured will be described.

Time Relationship 1

For example, in the case where the specific biological information is measured from the user when the biological information indicating an operation item of the equipment 16 is measured from the user, the processor 24 does not have to operate the equipment 16 according to the biological information indicating an operation item. On the other hand, in the case where the specific biological information is not measured from the user when the biological information indicating an operation item of the equipment 16 is measured from the user, the processor 24 operates the equipment 16 according to the biological information indicating an operation item.

Time Relationship 2

As another example, in the case where the specific biological information is measured from the user in a predetermined first time period including the point in time when the biological information indicating an operation item of the equipment 16 is measured from the user, the processor 24 does not have to operate the equipment 16 according to the biological information indicating an operation item On the other hand, in the case where the specific biological information is not measured from the user in the first time period, the processor 24 operates the equipment 16 according to the biological information indicating an operation item.

Time Relationship 3

As yet another example, in the case where the specific biological information is measured from the user in a predetermined second time period based on and before the point in time when the biological information indicating an operation item of the equipment 16 is measured from the user, the processor 24 does not have to operate the equipment 16 according to the biological information indicating an operation item. On the other hand, in the case where the specific biological information is not measured from the user in the second time period, the processor 24 operates the equipment 16 according to the biological information indicating an operation item.

Time Relationship 4

As yet another example, in the case where the specific biological information is measured from the user in a predetermined third time period based on and after the point in time when the biological information indicating an operation item of the equipment 16 is measured from the user, the processor 24 does not have to operate the equipment 16 according to the biological information indicating an operation item. On the other hand, in the case where the specific biological information is not measured from the user in the third time period, the processor 24 operates the equipment 16 according to the biological information indicating an operation item.

In the case where the specific biological information is measured from the user in any of the point in time when the biological information indicating an operation item of the equipment 16 is measured from the user, the first time period, the second time period, or the third time period, the processor 24 does not have to operate the equipment 16 according to the biological information indicating an operation item. On the other hand, in the case where the specific biological information is not measured from the user in the point in time when the biological information indicating an operation item of the equipment 16 is measured from the user, the first time period, the second time period, and the third time period, the processor 24 may operate the equipment 16 according to the biological information indicating an operation item.

In the case where the specific biological information is measured over a predetermined amount of time or longer, the processor 24 does not have to operate the equipment 16 according to the biological information indicating an operation item. Even if the specific biological information is measured, in the case where the specific biological information is measured over a duration less than the predetermined amount of time, the processor 24 may operate the equipment 16 according to the biological information indicating an operation item.

The specific biological information is biological information that is not expected to be measured under the circumstances in which the biological information indicating an operation item of the equipment 16 is measured. For example, biological information measured from the user while the user is asleep, in a stage just before sleep (such as a stage in which consciousness is dimmed for example), or while meditating correspond to examples of the specific biological information. The specific biological information is information indicating at least one of a brain wave, a quantity of cerebral blood flow, a cerebral magnetic field signal, pulse frequency, blood pressure, heart rate, an electrocardiogram waveform, a myoelectric waveform, eye movement, body temperature, perspiration, blood flow, respiration, and user movement measured from the user while the user is asleep, in a stage just before sleep, or while meditating, for example.

Hereinafter, Examples will be described.

EXAMPLE 1

For example, the specific biological information is information indicating a body temperature less than or equal to a threshold. The threshold is predetermined for example. The threshold may also be changed by the user. In addition, the threshold may also be determined for each user. In the case where the body temperature measured from the user is less than or equal to the threshold, the user is estimated to be asleep, in a stage just before sleep, or meditating. In the case where the body temperature of the user is less than or equal to the threshold, the processor 24 does not operate the equipment 16 according to the biological information indicating an operation item. In the case where the body temperature of the user exceeds the threshold, the processor 24 operates the equipment 16 according to the biological information indicating an operation item. The processor 24 may also determine whether or not the user is asleep, in a stage just before sleep, or meditating on the basis of biological information other than body temperature and the body temperature.

EXAMPLE 2

As another example, the specific biological information is information indicating a blood pressure less than or equal to a threshold. The threshold is predetermined for example. The threshold may also be changed by the user. In addition, the threshold may also be determined for each user. In the case where the blood pressure measured from the user is less than or equal to the threshold, the user is estimated to be asleep, in a stage just before sleep, or meditating. In the case where the blood pressure of the user is less than or equal to the threshold, the processor 24 does not operate the equipment 16 according to the biological information indicating an operation item. In the case where the blood pressure of the user exceeds the threshold, the processor 24 operates the equipment 16 according to the biological information indicating an operation item. The processor 24 may also determine whether or not the user is asleep, in a stage just before sleep, or meditating on the basis of biological information other than blood pressure and the blood pressure.

EXAMPLE 3

As yet another example, the specific biological Information is information related to the eyes of the user.

EXAMPLE 3-1

For example, the information related to the eyes of the user is information indicating that the eyes of the user are closed. In the case where biological information indicating that the eyes of the user are closed is measured, the user is estimated to be asleep, in a stage just before sleep, or meditating. In the case where biological information indicating that the eyes of the user are closed is measured, the processor 24 does not operate the equipment 16 according to the biological information indicating an operation item. In the case where biological information indicating that the eyes of the user are open is measured, the processor 24 operates the equipment 16 according to the biological information indicating an operation item. The processor 24 may also operate the equipment 16 according to the biological information indicating an operation item in the case where biological information indicating that the eyes of the user are closed is not measured.

The biological information indicating that the eyes of the user are closed is image data (for example, still image data or moving image data) expressing the eyes of the user, for example. For example, an image of the eyes of the user is taken by an imaging device such as a camera, and image data generated by the imaging is transmitted from the imaging device to the information processing device 10. By applying image analysis processing to the image data, the processor 24 determines whether or not the eyes of the user expressed in the image data are closed. Note that the imaging device corresponds to one example of the biological information measuring device 12.

EXAMPLE 3-2

As another example, the information related to the eyes of the user is information indicating the number of times the user blinks per a unit time, which is a number of blinks less than or equal to a threshold. The threshold is predetermined for example. The threshold may also be changed by the user. In addition, the threshold may also be determined for each user. In the case where the number of blinks per unit time is less than or equal to the threshold, the user is estimated to be asleep, in a stage just before sleep, or meditating. In the case where the number of blinks per unit time is less than or equal to the threshold, the processor 24 does not operate the equipment 16 according to the biological information indicating an operation item. In the case where the number of blinks per unit time exceeds the threshold, the processor 24 operates the equipment 16 according to the biological information indicating an operation item. For example, the processor 24 counts the number of blinks by the user on the basis of moving image data expressing the eyes of the user. The moving image data is generated by taking an image of the eyes of the user with an imaging device such as a camera.

EXAMPLE 3-3

As yet another example, the information related to the eyes of the user is information indicating that the pupils of the eyes of the user are contracted. The contraction of the pupils may be determined for each user. In the case where the pupils of the eyes of the user are contracted, it is estimated that the consciousness of the user is dimmed. In the case where the pupils of the eyes of the user are contracted, the processor 24 does not operate the equipment 16 according to the biological information indicating an operation item. In the case where the pupils of the eyes of the user are not contracted, the processor 24 operates the equipment 16 according to the biological information indicating an operation item. For example, the processor 24 determines whether or not the pupils of the eyes of the user are contracted on the basis of image data (for example, still image data or moving image data) expressing the eyes of the user. The image data is generated by taking an image of the eyes of the user with an imaging device such as a camera.

The processor 24 may also determine whether or not the user is asleep, in a stage just before sleep, or meditating on the basis of information related to the eyes of the user and other biological information.

EXAMPLE 4

The specific circumstances may also be circumstances in which biological information measured from the user satisfies a specific condition. For example, the specific condition is a condition for determining whether or not the user is asleep, in a stage just before sleep, or meditating, and the circumstances in which biological information measured from the user satisfies the specific condition are that the user is asleep, in a stage just before sleep, or meditating. The biological information may be biological information that indicates an operation item or biological information that does not indicate an operation item.

For example, the biological information is brain waves. Specifically, the biological information is brain waves in a specific frequency band. The brain waves in a specific frequency band are alpha waves for example. Alpha waves having an amplitude equal to or greater than a threshold are biological information that satisfies the specific condition. The threshold is predetermined for example. The threshold may also be changed by the user. In addition, the threshold may also be determined for each user. For example, in the case where the amplitude of alpha waves measured from the user is equal to or greater than the threshold, the user is estimated to be asleep, in a stage just before sleep, or meditating. In the case where the amplitude of alpha waves measured from the user is equal to or greater than the threshold, the processor 24 does not operate the equipment 16 according to the biological information indicating an operation item. In the case where the amplitude of alpha waves measured from the user is less than the threshold, the processor 24 operates the equipment 16 according to the biological information indicating an operation item

EXAMPLE 5

As another example, in the case where the biological information indicating an operation item is expressed by a waveform and the amplitude of the waveform is equal to or greater than a threshold, the processor 24 may operate the equipment 16 according to the biological information. On the other hand, in the case where the amplitude of the waveform is less than the threshold, the processor 24 does not operate the equipment 16 according to the biological information. The threshold is predetermined for example. The threshold may also be changed by the user. In addition, the threshold may also be determined for each user.

EXAMPLE 6

In the case where the amount of movement by the user is equal to or greater than a threshold, the processor 24 operates the equipment 16 according to the biological information indicating an operation item and in the case where the amount of movement by the user is less than the threshold, the processor 24 does not have to operate the equipment 16 according to the biological information indicating an operation item. The amount of movement by the user is measured by the biological information measuring device 12, such as a gyro sensor or an acceleration sensor, for example. The threshold is predetermined for example. The threshold may also be changed by the user. In addition, the threshold may also be determined for each user. In the case where the amount of movement by the user is less than the threshold, the user is estimated to be asleep, in a stage just before sleep, or meditating. For example, the amount of movement by a part of the body such as the head, arm, hands, or legs of the user is measured, and the processor 24 determines whether or not the user is asleep, in a stage just before sleep, or meditating on the basis of the amount of movement.

EXAMPLE 7

The specific circumstances may also be a specific environment where the user is present. The processor 24 determines whether or not the environment where the user is present is a specific environment on the basis of the environmental information measured by the environmental information measuring device 14.

An environment having a specific relationship with an operation item indicated by biological information is a specific environment. For example, the specific environment is an environment in which an operation item indicated by biological information measured from the user is not expected to be performed, or an environment in which the user is not expected to request the execution of an operation item indicated by biological information measured from the user.

To give a specific example, in the case where biological information measured from the user indicates an operation item of turning on a heater of an air conditioner even though the environment where the user is present is not an environment where the heater of the air conditioner is turned on, the processor 24 does not turn on the heater of the air conditioner. For example, in the case where the room temperature acting as environmental information is equal to or greater than a threshold for determining whether or not to turn on the heater, and biological information measured from the user indicates an operation item of turning on the heater of the air conditioner, the processor 24 does not turn on the heater of the air conditioner. On the other hand, in the case where the room temperature is less than the threshold and biological information measured from the user indicates an operation item of turning on the heater of the air conditioner, the processor 24 turns on the heater of the air conditioner.

As another example, in the case where biological information measured from the user indicates an operation item of turning on a cooler of an air conditioner even though the environment where the user is present is not an environment where the cooler of the air conditioner is turned on, the processor 24 does not turn on the cooler of the air conditioner. For example, in the case where the room temperature acting as environmental information is less than a threshold for determining whether or not to turn on the cooler, and biological information measured from the user indicates an operation item of turning on the cooler of the air conditioner, the processor 24 does not turn on the cooler of the air conditioner. On the other hand, in the case where the room temperature is equal to or greater than the threshold and biological information measured from the user indicates an operation item of turning on the cooler of the air conditioner, the processor 24 turns on the cooler of the air conditioner.

Figure 3:
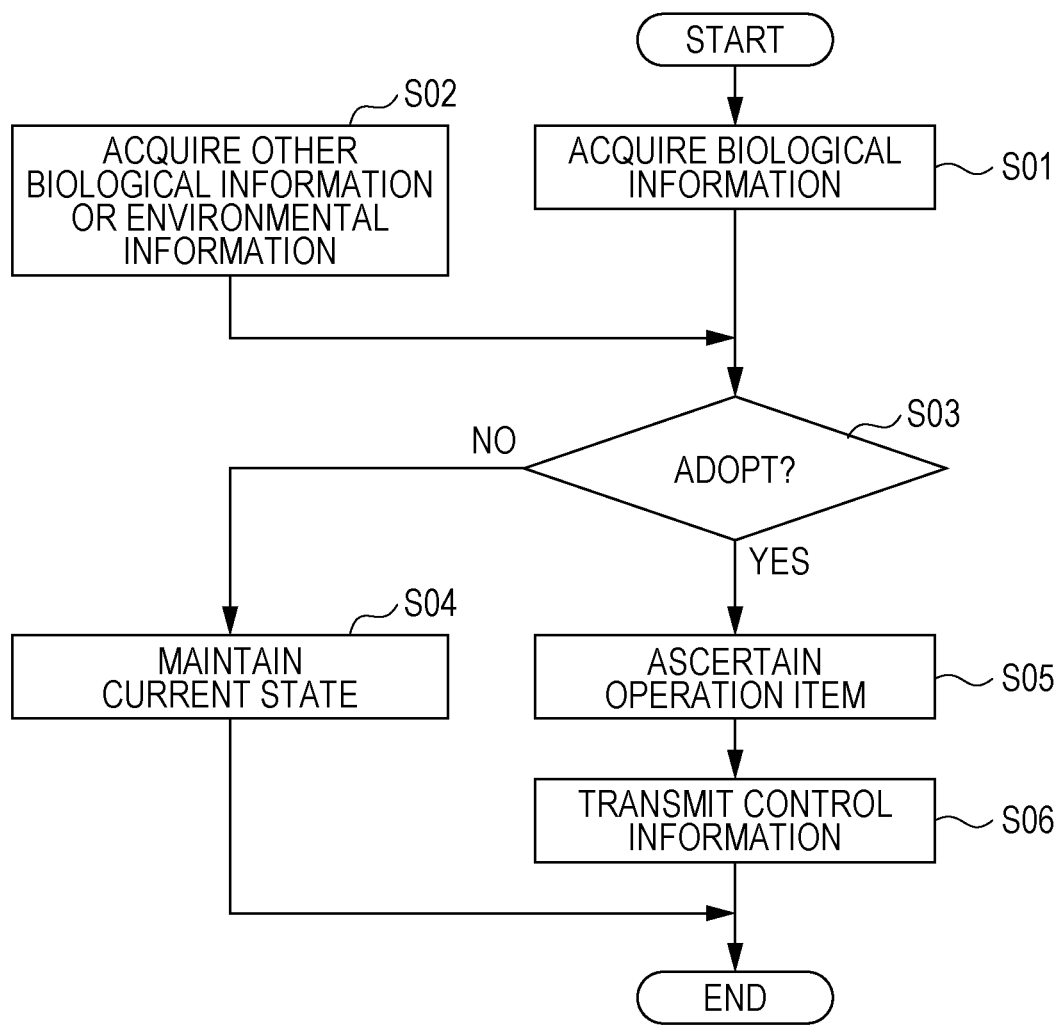
FIG. 3 is a diagram illustrating a flowchart that illustrates processes by the information processing device according to the exemplary embodiment.

Hereinafter, FIG. 3 will be referenced to describe a flow of processes by the information processing device 10. FIG. 3 is a flowchart illustrating processes by the information processing device 10.

Biological information about the user is measured by the biological information measuring device 12. The biological information measured by the biological information measuring device 12 is transmitted to the information processing device 10, and the processor 24 acquires the biological information (S01).

The biological information acquired in step S01 is biological information for operating the equipment 16. For example, the biological information measuring device 12 that measures the biological information for operating the equipment 16 is predetermined, and biological information measured by the predetermined biological information measuring device 12 is used as the biological information for operating the equipment 16. For the sake of convenience in the following description, the biological information for operating the equipment 16 is referred to as the "first biological information". For example, a brain wave is used as the first biological information for operating the equipment 16. In this case, a biological information measuring device 12 that measures brain waves is determined as the device to measure the first biological information for operating the equipment 16. The processor 24 acquires a brain wave measured by the biological information measuring device 12 that measures brain waves as the first biological information.

Also, other biological other than the first biological is measured by the biological information measuring device 12. The other biological information measured by the biological information measuring device 12 is transmitted to the information processing device 10, and the processor 24 acquires the other biological information (S02).

The other biological information acquired in step S02 is biological information for determining whether or not to adopt the first biological information acquired in step S01 as the biological information for operating the equipment 16. For example, the biological information measuring device 12 that measures the other biological information for making the determination is predetermined, and biological information measured by the predetermined biological information measuring device 12 is used as the other biological information for making the determination. Hereinafter, for convenience, the biological information for determining whether or not to adopt the first biological information as the biological information for operating the equipment 16 is referred to as the "second biological information". The second biological information may be the same type of biological information as the first biological information, or a different type of biological information from the first biological information. The second biological information may be biological information measured by the same biological information measuring device 12 as the biological information measuring device 12 that measures the first biological information, or biological information measured by a different biological information measuring device 12 from the biological information measuring device 12 that measures the first biological information. For example, in the case where brain waves are used as the first biological information, biological information other than brain waves is used as the second biological information. As another example, a brain wave in a first frequency band may be used as the first biological information, while a brain wave in a second frequency band different from the first frequency band may be used as the second biological information. The processor 24 acquires biological information acquired by the biological information measuring device 12 determined as the device to measure the second biological information as the second biological information. For example, biological information as described in Examples 1 to 6 above is used as the second biological information.

In addition, environmental information may also be measured by the environmental information measuring device 14. The environmental information measured by the environmental information measuring device 14 is transmitted to the information processing device 10, and the processor 24 acquires the environmental information (S02). The environmental information is information for determining whether or not to adopt the first biological information acquired in step S01 as the biological information for operating the equipment 16.

The processor 24 may acquire both the second biological information and the environmental information, or acquire one of either the second biological information or the environmental information. Note that the order of the processes in step S01 and S02 may be the same, the process in step S02 may be executed after the process in step S01, or the process in step S01 may be executed after the process in step S02.

Next, on the basis of at least one piece of information from among the second biological information and the environmental information, the processor 24 determines whether or not to adopt the first biological information acquired in step S01 as biological information for operating the equipment 16 (S03). In other words, in the hypothetical case where the first biological information indicates an operation item of the equipment 16, the processor 24 determines whether or not the operation item is an operation item intended by the user. In still other words, the processor 24 determines whether or not an instruction for the operation ascertained from the first biological information is an instruction intended by the user. For example, by executing any of the Examples among Examples 1 to 7 described above, the processor 24 determines whether or not to adopt the first biological information acquired in step S01 as the biological information for operating the equipment 16.

In the case where the circumstances of the user are the specific circumstances described in the above Examples, the processor 24 determines not to adopt the first biological information acquired in step S01 as the biological information for operating the equipment 16 (S03, No). That is, the processor 24 determines that the instruction for the operation ascertained from the first biological information is not an instruction intended by the user. In this case, the processor 24 maintains the current state of the equipment 16 (S04).

For example, in the case where the specific biological information described in the above Examples is included in the second biological information measured in step S02, or in the case where the specific biological information is measured as the second biological information, the processor 24 determines not to adopt the first biological information acquired in step S01 as the biological information for operating the equipment 16.

In the case where the circumstances of the user are not the specific circumstances described above, the processor 24 determines to adopt the first biological information acquired in step S01 as the biological information for operating the equipment 16 (S03, Yes). That is, the processor 24 determines that the instruction for the operation ascertained from the first biological information is an instruction intended by the user.

For example, in the case where the specific biological information described above is not included in the second biological information measured in step S02, or in the case where the specific biological information described above is not measured as the second biological information, the processor 24 determines to adopt the first biological information acquired in step S01 as the biological information for operating the equipment 16.

In the case where the first biological information acquired in step S01 is adopted as the biological information for operating the equipment 16 (S03, Yes), the processor 24 ascertains the equipment 16 to be operated and ascertains the operation item of the equipment 16 on the basis of the first biological information (S05).

For example, the processor 24 compares the first biological information acquired in step S01 to each piece of standard biological information registered in the management information described above, and searches for standard biological information whose difference from the first biological information is inside a tolerance. The processor 24 specifies the operation item of the equipment 16 associated with the standard biological information returned by the search. With this arrangement, the equipment 16 to be operated is ascertained, and the operation item of the equipment 16 is ascertained. The tolerance is predetermined. The tolerance may also be changed by the user. The tolerance may also be determined for each user.

In the case where the search returns multiple pieces of standard biological information whose difference from the first biological information acquired in step S01 is inside the tolerance, the processor 24 specifies the standard biological information having the smallest difference from the first biological information from among the multiple pieces of standard biological information. The processor 24 specifies the operation item of the equipment 16 associated with the specified standard biological information.

The standard biological information may be information indicating a characteristic component of the biological information. In this case, the processor 24 may extract the characteristic component from the first biological information, and search for standard biological information having a component whose difference from the extracted component is inside a tolerance. For example, in the case where brain waves are used as the first biological information, the processor 24 may estimate the operation item expressed by brain waves by extracting a characteristic component from measured brain waves, and analyzing the component.

Next, the processor 24 transmits control information including information indicating the operation item ascertained in step S05 to the equipment 16 (S06). The equipment 16 receiving the control information operates in accordance with the control information. With this arrangement, the processor 24 operates the equipment 16.

Note that the processor 24 may also transmit control information to the equipment 16 and operate the equipment 16 in the case where the user agrees to allow the equipment 16 to be operated. For example, the processor 24 may cause the UI 20 to display a message for querying the user about whether or not to agree to allow the equipment 16 to be operated, or output the message as sound. If biological information indicating agreement is measured from the user and the processor 24 acquires the biological information, the processor 24 transmits control information to the equipment 16 to operate the equipment 16. For example, in the case where biological information indicating agreement is measured from the user and the processor 24 acquires the biological information within a predetermined amount of time from the point in time when the message is displayed or output as sound, the processor 24 transmits control information to the equipment 16 to operate the equipment 16. In the case where biological information indicating agreement is not measured from the user, the processor 24 does not transmit control information to the equipment 16.

In step S01, in the case where biological information whose difference from the standard biological information is inside the tolerance is not acquired, an operation item is not specified, and the current state of the equipment 16 is maintained.

For example, in the case where first biological information indicating an operation item of turning on a certain piece of equipment 16 is measured from the user, the processor 24 transmits control information including information indicating the operation item of turning on the equipment 16 to the equipment 16. With this arrangement, the equipment 16 is turned on. Also, in the case where first biological information indicating an operation item of setting a function level of a certain piece of equipment 16 to a certain value is measured from the user, the processor 24 transmits control information including information indicating the operation item of setting a function level of the equipment 16 to the value to the equipment 16. With this arrangement, the function level of the equipment 16 is set to the value.

Hereinafter, a specific example of the management information will be described.

Figure 4:
FIG. 4 is a diagram illustrating a management table.
Figure 4:

FIG. 4 illustrates an example of a management table as one example of the management information. The data in the management table is stored in the storage device 22. The data in the management table may also be stored in an external device such as a server, without being stored in the storage device 22.

In the management table, an ID, a standard brain wave, an operation information indicating an operation item of the equipment 16 are associated with each other in advance. The standard brain wave is one example of standard biological information. Herein, a brain wave is used as one example of the standard biological information, but biological information other than brain waves may also be used as the standard biological information.

The ID is information for managing the information registered in the management table.

The standard brain wave is determined by statistical processing, for example, and is a brain wave that is generally anticipated to be occur in the user who performs the operation item associated with the standard brain wave, or a brain wave that is generally anticipated to occur in the user who requests the execution of the operation item.

The standard brain wave may be a brain wave in a specific frequency band, or a brain wave containing brain waves in multiple frequency bands.

The operation information is information including equipment identification information for identifying the equipment 16 to be operated and information indicating the operation item to be performed with respect to the equipment 16. For example, the operation item may be an operation of turning the equipment 16 on or off, or an operation of setting a function level of the equipment 16.

For example, the standard brain wave associated with the ID "1" is a brain wave expressing an operation item of turning on the cooler of an air conditioner. The standard brain wave associated with the ID "2" is a brain wave expressing an operation item of turning off the cooler of an air conditioner.

For example, in the case where a brain wave whose difference from the standard brain wave associated with the ID "1" is inside the tolerance is measured from the user, the processor 24 specifies the operation item of "turn on cooler of air conditioner" associated with the standard brain wave. Additionally, the processor 24 transmits control information including information indicating the operation item of "turn on cooler of air conditioner" to the air conditioner. The air conditioner operates in accordance with the control information. With this arrangement, the cooler of the air conditioner turns on.

Also, the processor 24 may compute a similarity between a brain wave measured from the user and a standard brain wave, and determine whether or not the similarity is a threshold or greater. The threshold is a value corresponding to the tolerance. In the case where the similarity between the brain wave measured from the user and the standard brain wave is the threshold or greater, the processor 24 determines that the brain wave measured from the user and the standard brain wave are similar to each other. In other words, the processor 24 determines that the difference between the brain wave measured from the user and the standard brain wave is inside the tolerance. In the case where a brain wave whose similarity with the standard brain wave associated with the ID "1" is the threshold or greater is measured from the user, the processor 24 specifies the operation item of "turn on cooler of air conditioner".

The standard biological information and the operation information may be associated with each other and registered in the management table for each user. For example, biological information measured from a user may be registered as standard biological information for the user in the management table.

Figure 5:
FIG. 5 is a diagram illustrating a management table.
Figure 5:
Figure 5:

FIG. 5 illustrates an example of a management table in which specific standard biological information for individual users is registered. In the management table illustrated in FIG. 5, an ID, a standard brain wave given as an example of standard biological information, operation information, and user information are associated with each other. The user information is information for identifying each user (such as a username or a user ID, for example).

The standard brain wave associated with the user information is a brain wave measured from the user when the user indicated by the user information performs the operation item associated with the standard brain wave, or a brain wave measured from the user when the user requests the operation item. Each standard brain wave measured from each user is measured from each user in advance and registered in the management table.

For example, the brain wave of a user A when the user A manually turns on the cooler of the "air conditioner" is measured by the biological information measuring device 12, and the measured brain wave is registered in the management table as a standard brain wave expressing the operation item of "turn on cooler of air conditioner" by the user A.

In this case, the measured standard brain wave of the user A is registered in the management table in association with operation information indicating the operation item of "turn on cooler of air conditioner" and user information for identifying the user A. The registration may be performed using the information processing device 10 or using another device. In the example illustrated in FIG. 5, the information is registered as the information with the ID "1". The same applies to other operations and other users.

Note that the work of registration may also be performed multiple times, and the average of multiple brain waves measured thereby may also be registered as a standard brain wave. For example, the work of the user manually turning on the cooler of the "air conditioner" and the biological information measuring device 12 measuring the brain wave produced from the user A at the time may be performed multiple times, and an average of the multiple brain waves measured thereby may be registered in the management table as a standard brain wave of the user A.

For example, in the case where the user A is logged in to the information processing device 10, and a brain wave whose difference from the standard brain wave associated with the ID "1" is inside the tolerance is measured from the user A, the processor 24 turns on the cooler of the "air conditioner" by transmitting control information including the operation information associated with the ID "1" to the "air conditioner". Described in further detail, if a brain wave is measured by the biological information measuring device 12 while the user A is logged in to the information processing device 10, the processor 24 searches for a standard brain wave that is registered in the management table in association with user information for identifying the logged-in user A. In the example illustrated in FIG. 5, the standard brain wave associated with the ID "1" and the standard brain wave associated with the ID "3" are registered in the management table as standard brain waves of the user A, and therefore these standard brain waves are returned by the search. In the case where the difference between the measured brain wave and the standard brain wave associated with the ID "1" is inside the tolerance, the processor 24 turns on the cooler of the "air conditioner" by transmitting control information including the operation information associated with the ID "1" to the "air conditioner". In the case where the difference between the measured brain wave and the standard brain wave associated with the ID "3" is inside the tolerance, the processor 24 turns off the cooler of the "air conditioner" by transmitting control information including the operation information associated with the ID "3" to the "air conditioner".

As another example, in the case where the user operating the equipment 16 is set to "user A" in the information processing device 10, and a brain wave whose difference from the standard brain wave associated with the ID "1" is inside the tolerance is measured from the user A, the processor 24 may turn on the cooler of the "air conditioner" by transmitting control information including the operation information associated with the ID "1" to the "air conditioner". Described in further detail, if a brain wave is measured by the biological information measuring device 12 while the user operating the equipment 16 is set to "user A" in the information processing device 10, the processor 24 searches for a standard brain wave that is registered in the management table in association with user information for identifying the user A who is the user operating the equipment 16. In the case where the difference between the measured brain wave and the standard brain wave associated with the ID "1" is inside the tolerance, the processor 24 turns on the cooler of the "air conditioner" by transmitting control information including the operation information associated with the ID "1" to the "air conditioner". The user operating the equipment 16 is set in the information processing device 10 by the user, for example.

For users other than the user A, each piece of information is likewise registered in the management table similarly to the user A. For example, each piece of information associated with the ID "2" is information related to an operation when a user B turns on the cooler of the "air conditioner". Each piece of information associated with the ID "3" is information related to an operation when the user A turns off the cooler of the "air conditioner".

In the management tables illustrated in FIGS. 4 and 5, operation information indicating operations for turning the equipment 16 on or off is registered, but operation information indicating a function level of the equipment 16 may also be registered in the management table.

Note that in the exemplary embodiment above, the processing by the processor 24 may also be executed by another device (for example, an external device such as a server) other than the information processing device 10, and information indicating a result of the processing may be displayed on the UI 20 or output as sound information.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to operate equipment by sending control information to the equipment based on a first biological information measured from a user with a first biological information measure, the first biological information indicating an operation item of the equipment, if a second biological information indicating that the user is in a state of sleep, in a stage just before sleep, or while meditating is not measured from the user with a second biological information measure within a predetermined time period from a first point of time when the first biological information is measured from the user with the first biological information measure,
wherein the processor is further configured to not operate equipment by not sending the control information to the equipment based on the first biological information, if the second biological information is measured from the user with the second biological information measure within the predetermined time period.

2. The information processing device according to claim 1, wherein the second biological information is information indicating a body temperature less than or equal to a threshold.

3. The information processing device according to claim 1, wherein the second biological information is information related to eyes of the user.

4. The information processing device according to claim 3, wherein the information related to the eyes of the user is information indicating that the eyes of the user are closed.

5. The information processing device according to claim 3, wherein the information related to the eyes of the user is information indicating a number of times the user blinks per a unit time, being a number of blinks less than or equal to a threshold.

6. The information processing device according to claim 3, wherein the information related to the eyes of the user is information indicating that pupils of the eyes are contracted.

7. The information processing device according to claim 1, wherein the first biological information is a first brain wave measured from the user at the first point of time, and the second biological information is a second brain wave measured from the user at a second, different point of time.

8. The information processing device according to claim 1, wherein at least one of the first biological information or the second biological information is measured with a wearable sensor worn by the user.

9. The information processing device according to claim 1, wherein the second biological information measured from the user at a second point of time that is before the first point of time when the first biological information is measured from the user.

10. The information processing device according to claim 1, wherein the second biological information measured from the user at a second point of time that is after the first point of time when the first biological information is measured from the user.

11. A non-transitory computer readable medium storing a program causing a computer to execute a process for processing information, the process comprising: causing equipment to be operated by sending control information to the equipment based on a first biological information measured from a user with the first biological information measure, the first biological information indicating an operation item of the equipment, if a second biological information indicating that the user is in a state of sleep, in a stage just before sleep, or while meditating is not measured from the user with the second biological information measure within a predetermined time period from a first point of time when the first biological information is measured from the user with the first biological information measure, and
causing the equipment to not be operated by not sending the control information to the equipment based on the first biological information, if the second biological information is measured from the user with the second biological information measure within the predetermined time period.

12. The information processing device according to claim 11, wherein at least one of the first biological information or the second biological information is measured with a wearable sensor worn by the user.

13. The information processing device according to claim 11, wherein the first biological information is a first brain wave measured from the user at the first point of time, and the second biological information is a second brain wave measured from the user at a second, different point of time.

14. An information processing device comprising: operation controlling means for operating equipment by sending control information to the equipment based on a first biological information measured from a user with the first biological information measure, the first biological information indicating an operation item of the equipment, if a second biological information indicating that the user is in a state of sleep, in a stage just before sleep, or while meditating is not measured from the user with the second biological information measure within a predetermined time period from a first point of time when the first biological information is measured from the user with the first biological information measure, wherein the operation controlling means does not operate the equipment by not sending the control information to the equipment based on the first biological information, if the second biological information is measured from the user with the second biological information measure within the predetermined time period.

15. The information processing device according to claim 14, wherein at least one of the first biological information or the second biological information is measured with a wearable sensor worn by the user.

16. The information processing device according to claim 14, wherein the first biological information is a first brain wave measured from the user at the first point of time, and the second biological information is a second brain wave measured from the user at a second, different point of time.

* * * * *